(12) United States Patent
Angel et al.

(10) Patent No.: US 8,457,601 B2
(45) Date of Patent: Jun. 4, 2013

(54) KEY RESPONSIVE RECORD, NAVIGATION AND MARKING CONTROLS FOR COMMUNICATIONS SYSTEM

(75) Inventors: Albert Angel, N. Miami Beach, FL (US); Lesli Angel, N. Miami Beach, FL (US); Thilo Rusche, Arlington, VA (US); Aron Leibowich, Weston, FL (US); Scott Snyder, Umatilla, FL (US); Rica A. Leibowich, Weston, FL (US); Arthur Rosenberg, Reston, VA (US)

(73) Assignee: Certicall, LLC, N. Miami, FL (US)

( * ) Notice: Subject to any disclaimer, the term of this patent is extended or adjusted under 35 U.S.C. 154(b) by 191 days.

(21) Appl. No.: 13/023,890

(22) Filed: Feb. 9, 2011

(65) Prior Publication Data
US 2012/0202465 A1    Aug. 9, 2012

(51) Int. Cl.
*H04W 4/00* (2009.01)
(52) U.S. Cl.
USPC ........ 455/412.1; 455/72; 455/566; 379/88.19
(58) Field of Classification Search
USPC ................. 455/412.1, 72, 566; 379/88.19
See application file for complete search history.

(56) References Cited

U.S. PATENT DOCUMENTS

| | | | | |
|---|---|---|---|---|
| 5,303,296 A | | 4/1994 | Zucker | 379/67 |
| 5,647,834 A | | 7/1997 | Ron | 600/23 |
| 6,029,063 A | * | 2/2000 | Parvulescu et al. | 455/412.1 |
| 6,661,879 B1 | | 12/2003 | Schwartz et al. | 379/88.25 |
| 6,668,044 B1 | | 12/2003 | Schwartz et al. | 379/68 |
| 6,754,181 B1 | | 6/2004 | Elliott et al. | 370/252 |
| 6,907,408 B2 | | 6/2005 | Angel | 705/64 |
| 6,987,841 B1 | | 1/2006 | Byers et al. | 379/88.17 |
| 8,229,509 B2 | * | 7/2012 | Paek et al. | 455/566 |
| 2002/0120544 A1 | | 8/2002 | Butcher | 705/36 |
| 2005/0286687 A1 | * | 12/2005 | Sanmugasuntharam et al. | 379/88.19 |
| 2006/0030273 A1 | * | 2/2006 | Al-Azzawi | 455/72 |
| 2006/0112279 A1 | | 5/2006 | Cohen et al. | 713/86 |
| 2007/0067385 A1 | | 3/2007 | D'Angelo et al. | 709/203 |
| 2007/0185718 A1 | | 8/2007 | Di Mambro et al. | 704/273 |
| 2007/0211876 A1 | | 9/2007 | Othmer et al. | 379/201.01 |
| 2008/0091425 A1 | | 4/2008 | Kane | 704/246 |
| 2009/0306981 A1 | | 12/2009 | Cromack et al. | 704/235 |

OTHER PUBLICATIONS

PCT Search Report, Oct. 21, 2011.
Related Co-pending U.S. Appl. No. 12/786,456, filed May 18, 2010.
IBM Research Report, "Content Immutable Storage: Truly Trustworthy and Cost-Effective storage for Electronic Records" Windsor W. Htsu, et al., Oct. 18, 2004.

* cited by examiner

*Primary Examiner* — David Q Nguyen
(74) *Attorney, Agent, or Firm* — Robert C. Kain, Jr.

(57) ABSTRACT

The key responsive record, navigate and marking method operates with a communications station networked with telecommunications enabled devices (cell phones with speakers and microphones). Controls are * and # symbol keys (mechanical or virtual). The station includes an IVR and record data stores. The # key controls RECORD ON/OFF and the * control is end-of-comm-session (EOS). The station activates functions based control key detection. Toggle ON/OFF/ON operations are activated. The EOS stops recording and activate post-recording sessional routines. Other keystroke functions are user-assigned or system defaults for numeric keys 1-2-3-4-5-6-7-8-9-0. Navigation controls are thus activated.

23 Claims, 3 Drawing Sheets

KEY RESPONSIVE RECORD, NAVIGATION AND MARKING CONTROLS FOR COMMUNICATIONS SYSTEM

The present application is related to U.S. patent Ser. No. 12/782,456, filed May 18, 2010, entitled "Certified Communications System and Method" the contents of which is incorporated herein by reference thereto.

The present invention relates to a key responsive record, navigation marking control method and system for a communications system which enables one or more users to record, at a communications station, voice and audio sounds captured during an active telecommunications session.

BACKGROUND OF THE INVENTION

There exists a need, due to the widespread use of cellular telephones and Internet communications, to provide a user on an activated telecommunications enabled device to record voice and audible sounds either upon command or during a an active telecommunications session. Further details and advantages of such a system are described in the Certified Communications System patent discussed earlier.

Also, the interface provided to the user engaged in an active telecommunications session is an important tool in the Certified Communications System patent.

OBJECTS OF THE INVENTION

It is an object of the present invention to provide a simple, easily identified, and memorable user interface control for a communications system which primary purpose is to record audio events and at a communications recording station interconnected and communicating with an enabled and active telecommunications device.

It is another object of the present invention to provide controls on the telecomm enabled device (the user's cell phone, for example) for activating a recording event at the communications recording station, pausing the recording event, and terminating the telecommunications session by activation of certain defined key elements on the telecommunications enabled device.

It is a further object of the present invention to provide the user with control commands linked to the key elements on the telecommunications enabled device such that the user can preset certain functions, return to menu, and activate certain supplemental functions without delay.

It is another object of the present invention to provide the user with a visual indicator of the RECORD ON function and RECORD OFF function, based upon the operations at the communications station.

Additional objectives of the present invention relate to memorable user interface controls for indexing, marking and otherwise processing and activating functions at the communications station.

BRIEF DESCRIPTION OF THE DRAWINGS

Further objects and advantages of the present invention can be found in the detailed description of the preferred embodiments when taken in conjunction with the accompanying drawings in which:

FIGS. 2A and 2B diagrammatically illustrate the process flow wherein FIG. 2A is linked to FIG. 2B by jump point A-1 and wherein FIG. 2A shows a general operation process and FIG. 2B shows a key responsive operation process in accordance with the principles of the present invention.

SUMMARY OF THE INVENTION

Figure 1:
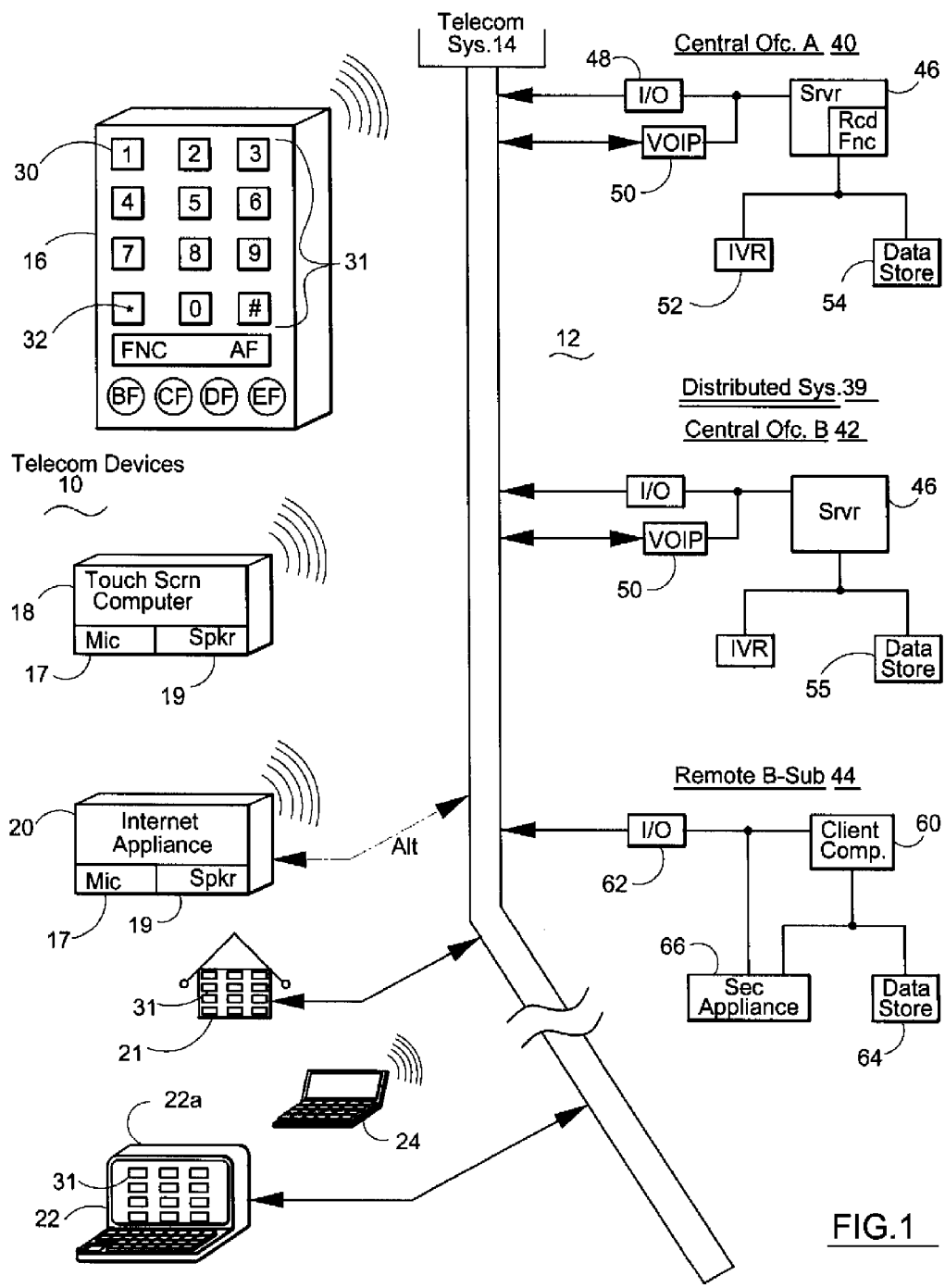
FIG. 1 diagrammatically illustrates various components and system elements of the key responsive record, navigate and marking controls for the communication system.

The key responsive record, navigate and marking method controls a communications stations in a communications system. The communication system includes the plurality of telecommunications enabled devices, including but not limited to, cellular telephones, smart phones, touch screen computers having microphones and speakers, Internet appliances with microphones and speakers, land based telephones, other types of wireless telephones and cellular appliances (see BLACKBERRY phones), computers which are communicatively coupled to the telecommunications network, and other telecommunications enabled devices.

Each of these enabled devices includes a plurality of actuatable control elements which include keys on a mechanical or virtual keypad or key icons displayed on a screen. Memorable key elements include the key element which bears a * or asterisk key (a * symbol) and the key element bearing a # symbol. The telecommunications enabled devices discussed herein also include a speaker and a microphone which enables the enabled device to audibly announce certain information to the user. The microphone on the telecommunications enabled device permits the device to capture audible sounds by the user or in the user's vicinity.

The telecommunications enabled devices are communicatively coupled by a telecommunications network to one or more communications recording stations. The telecommunications network may be the telephone lines, the cable lines or wireless networks, or a cellular telephone network or any other type of Internet or telecommunications networked system.

The communications station may be a singular central office or may be a distributed system, located at various locations and remotely distributed apart but communicatively coupled via the telecommunications network. Whether a central station or a distributed system is employed, the communications station includes a data recording module which records, upon command, signals representing the audio sounds at and near the telecommunications enabled device. The communications station, or its distributed associated stations, includes an interactive voice response IVR module which enables the communications station to audibly announce or effect the audible announcement and presentation of instructions to users and capture and process responses by users on the telecommunications enabled device. The interactive voice response module effects the delivery of audible instructions to a user operating at activated telecommunications enabled device.

The key responsive record, navigate and mark control method includes various functions depending upon selection of a key element by a user. One of the several important functions herein is the use of the # symbol and the * symbol on the telecommunications enabled device. With respect to the # symbol, the communications system begins recording (RECORD ON) or pauses the recording (RECORD OFF) depending upon the receipt at the communications station of a # control signal. In other words, when the user activates a # control signal at the telecommunications enabled device, the communications system, either the central station or a distributed storage station, begins recording the signals representing audio sounds at the enabled devices. If two parties are speaking on telecommunications enabled devices linked in the network, the communications system records that conversation dependent upon the sequential depression and activation of the key element bearing the # control signal. When the # key is struck or activated by one user the record function is turned ON. When the user activates the # control key a second time, the record function is turned OFF. The sequential activation and deactivation of the recording function in the communications station (ON/OFF/ON, as in a toggle switch) effected by the sequential depression or activation of the # control key.

Another important feature of the several features discussed herein, is the utilization of the * key on the telecommunications enabled device. In the present invention, when the user strikes or activates the * key, the communications station activates an end of telecommunications session (EOS) event routine which includes the cessation of the recording session by the data recording module at the communications station. Other comm station actions are typically executed at the EOS prior to the decoupling or disconnection of the enabled device, the telecomm network and the comm station. Such other EOS actions are described in greater detail in the referenced Certified Communications System patent document.

Other functions in the enabled devices are user-assigned to the remaining numeric key elements bearing numeric symbols 1, 2, 3, 4, 5, 6, 7, 8, 9 and 0. Navigation controls are thus activated based upon key element assignments. Recorded data marking is also subject to key stroke assigned functions and key elements. Some assignments are preset by the comm station as defaults and other key assignments are user programmable.

DETAILED DESCRIPTION OF THE PREFERRED EMBODIMENTS

The present invention relates to a key responsive record, navigate and marking controls for a communication system. Similar numerals designate similar items throughout the patent specification. Also, additional functions may be assigned to respective key elements for the telecommunications enabled devices as those functions are described in greater detail in the Certified Communications System patent document which is currently pending as Ser. No. 12/782,456 filed May 18, 2010, the contents of which is incorporated herein by reference thereto.

FIG. 1 diagrammatically illustrates the major system components for the present invention. Various telecommunications enabled devices 10 are shown as being communicatively coupled or connected to a telecommunications network 14. Further, network 14 enables communications between the enabled devices 10 to one or more communications recording station generally identified as station 12. As discussed later, station 12 may be a singular central office station 40 or may be represented by a distributed communications station made of sub-stations including central office B and remote station B-sub.

The present invention can be utilized in conjunction with various types of telecommunications enabled devices including cellular telephone 16 which may be a conventional cellular telephone with mechanical keys which are depressed by the user or may be a smart phone which has a relatively large display area which displays control key element icons such that the user activates keypad functions by touching the display area in the region where a key element is displayed. Sometimes, these key elements are identified by icons displayed on a screen (such as a computer monitor). Telecommunications enabled devices also include touch screen computer 18, Internet appliances 20, land based telephone 21, enabled computers 22, and other types of cell phones or mobile telephones 24. All of these telecommunications enabled devices 16, 18, 20, 21, 22 and 24 include some type of speaker or audio announcing device as well as a microphone for capturing audio sounds in the vicinity of the enabled device. Although cellular telephone 16 is not shown to include a microphone and speaker, it is well established that mobile phones and cellular phones and smart phones have speakers and microphones. Touch screen computer 18 includes a display area that can be configured to show key icons such as those discussed below in connection with the key elements in enabled device 16. For operability with the comm station, the computer 18 should include a microphone 17 and a speaker 19. The same is true regarding Internet appliance 20. Land based telephone 21 is known to include a keypad showing key elements discussed later as key elements 31 on device 16. Computer 22 has a monitor 22a which shows key elements 31 (discussed later). Computer 22 will include some type of mechanism such as a mouse or a touch pad or a track stick which enables the user to select the key elements 31 on the computer display to enable the telecommunications and communications control events discussed later. Computer 22, as known by a person of ordinary skill in the art, sometimes includes speakers and microphones. In order for computer 22 to be classified as a telecommunications enabled device for the purposes of this patent specification, the computer should include a speaker and a microphone or the equivalent thereof. For example, a headset having a speaker and a microphone coupled to computer 22 results in a telecommunications enabled device as computer 22. Cell phone 24 is simply a different representation of cell phone 16.

In order to simplify the explanation of portions of the present invention, these telecommunications enabled devices are sometimes collectively referred to herein as a "cell phone" however the discussion of the operation of the responsive record, navigate and marking method is applicable to all telecommunications enabled devices notwithstanding that the pertinent discussion only identifies a cellular telephone. Therefore, when the discussion of a cellular telephone includes a discussion of key elements 31, such discussion applies equally to key element 31 displayed on touch screen computer 18, displayed on or represented by keypad on Internet appliance 20, refers to the keypad and key element 31 of land based telephone 21, refers to the key element 31 displayed on computer 22, and the keypad for cellular telephone 24.

The telecommunications enabled device or cellular telephone 16 includes a plurality of actuatable control key elements 31. These key elements may be displayed as icons on a display screen or may be a mechanical keypad or keys on a key pad for the telecommunications device. Cell phone 16 may be a smart phone. With respect to actuatable control elements 31, these elements include keys or key icon such as the symbol "1" key element 30. Therefore, actuatable control key elements 31 include actuatable keys elements 1, 2, 3, 4, 5, 6, 7, 9, and 0. In addition, actuatable control elements 31 include the * key symbol on key 32 and the # key symbol on key 34. As is known by persons with ordinary skill in the art, the cellular telephone 16 if configured as a smart phone, includes other actuatable control keys such as function AF key 36a and other actuatable control key elements such as function BF key 36b and the function keys CF, DF, and EF. Typically on smart phones, these are icon or virtual keys on the phone display.

In any event, the cell phone or other telecom enabled devices 16, 18, 20, 21, 22 and 24, can be enabled to be in communication via telecom system 14 with central office A 40 or the distributed station system 39. The distributed station system 39 generally includes a central office B 42 and a remote office or sub-station B-sub 44. In either event, several of the components in central office A, central office B and remote sub-station 44 are generally similar. For additional details and supplemental services provided by the central office or other related service and functional providers, reference is made to the patent document entitled "Certified Communications System and Method" which is incorporated herein by reference thereto.

In general, central office 40 includes a server 46 (more properly designated as a computer with a processor, loaded to perform designated functions on command) which is coupled to telecom system 14 via an input/output device, module or functional element 48. Since certain audible instructions and signals representing those audible instructions are provided to the cell phones and enabled devices 16, 18, 20, 21, 22 and 24, central office 40 includes a functional block or structural module providing interactive voice response or IVR 52. The VOIP or voice over interne protocol unit 50 enhances the telecomm session routines. VOIP module 50 may be connected to telecom system 14 via input/output unit 48. The interconnection of various components to the telecom system is known to persons of ordinary skill in the art. Server computer processor 46 at central office 40 also includes interactive voice response IVR module 52 which enables server 46 and the associated components to provide interactive voice response data signals to and from enabled devices 10. The IVR effects the production of audio commands at the cell phones and other enabled devices and translates into machine or computer language audible instructions provided by the users at the cell phones and enabled devices. Central office 40 also includes a data storage module 54. The server computer 46 has a recording module (RCD fnc, a record function process) which enables the server in conjunction with a machine translation unit to record and store in data store 54 the audible signals and sounds developed and presented at the cell phones and other enabled devices. Server 46 has functional modules and computer program elements that enable the recording of signals and enable the audio presentation instructions from in data store 54. Further, server 46 utilizes the IVR module 52 to present to users at the cell phone 16 and other enabled devices audio instructions based upon information stored in data store 54. As a preview, when the user strikes # key element 34, the control system begins recording the audible sounds at the enabled devices and further the control station or central office 40 audibly announces at the enabled device that the recording session is ON (toggle ON). A visual RECORD ON indicator is also enabled at the telecomm enabled device 10. Upon depression of # control key 34 at a later time (toggle OFF), the central office via server 46 and data store 54 turns OFF the recording module and process in server 46 and further announces to the users that the cell phone 16 or other telecommunications devices that the recording function at communications recording station 40 is OFF. Therefore, the user at cell phone 16 can toggle ON the recording function and toggle OFF the recording function based upon the sequential activation of # symbol key 34.

Distributed system 39 is similar in many respects to central office station 40. However, central office 42 includes server computer 46 and data store 55 but the actual recording of the signals representing the audible sounds at the telecommunications enabled devices is carried out at the remote sub-station 44 in data store 64. In other words, in certain situations, central office 42 is effected by cell phone control commands but the actual storage of recorded data a telecomm session is stored in the remote sub-station 44 and data store 64. For example in an insurance company application, the insurance company may want all recorded data on site at their local computer system which includes client computer 60. Client computer is coupled to the telecom system 14 via input/output 62. That remote sub-station 44 includes voice and data storage facility 64 as well as a security appliance 66 which confirms to central office 42 that the voice data recording session is properly stored in data store 64. If any alteration of the recorded session in data store 64 occurs, security appliance 66 communicates with central office 42. This is discussed in detail with additional functions and operations in the patent application entitled "Certified Communications System and Method."

Since the operation described herein can be carried out either as singular central office location 40 or distributed system 39, which includes central office 42 and remote sub-office 44, persons with ordinary skill in the art recognize that additional services can be provided by widely distributed and dispersed systems to activate various supplemental services such as translation, transcription and distribution. These functions can be distributed between central office 42 and remote office 44. For example, the voice command for beginning, pausing and terminating a recorded session may be generated from remote sub-station 44 rather than having those instructions generated from central office 42. In this scenario, the remote sub-office 44 would include IVR module 52 and VOIP module 50 if necessary to provide that functionality and instructions to the cell phone or enabled device 10.

Figure 2A:
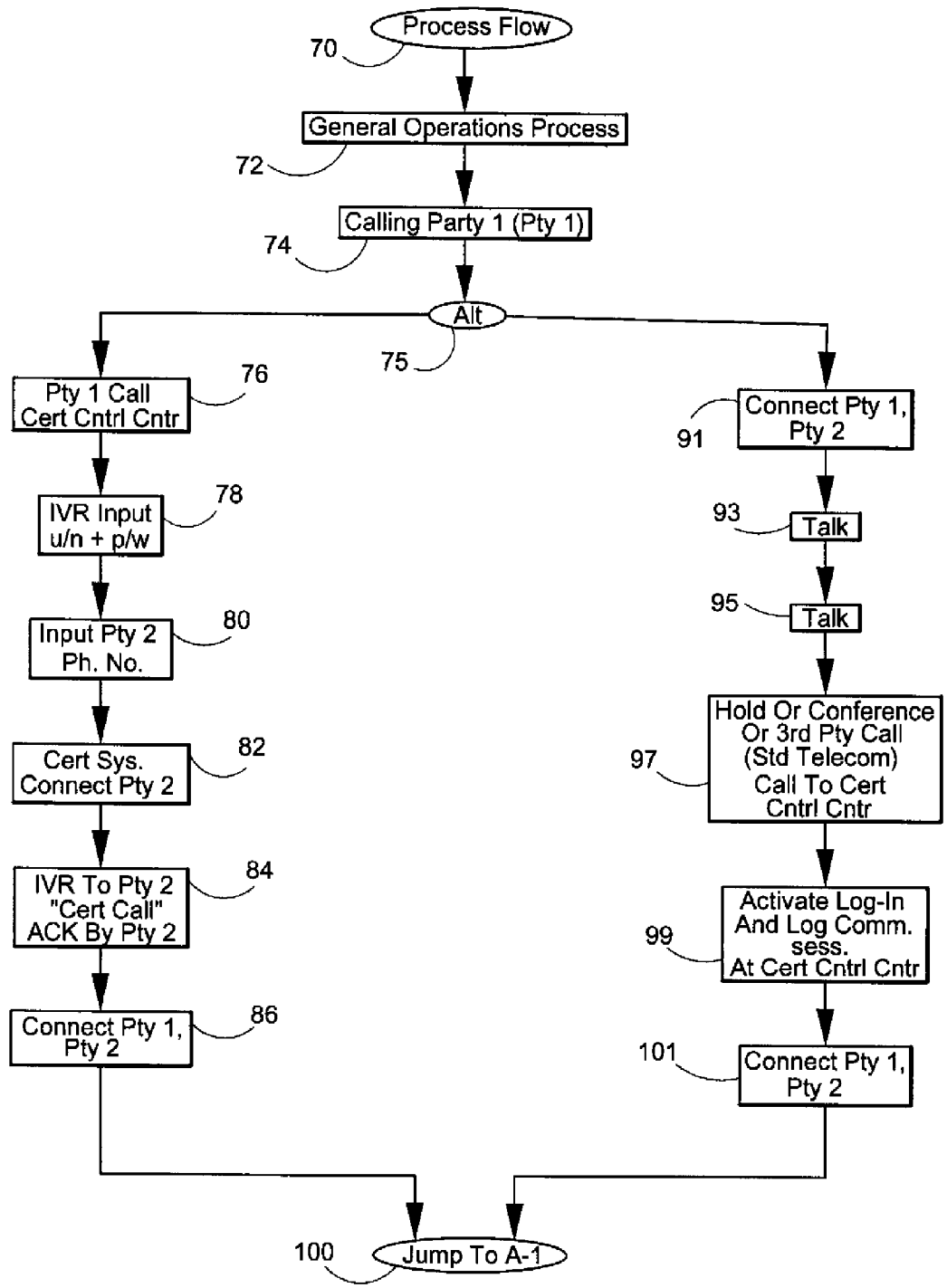
Figure 2B:
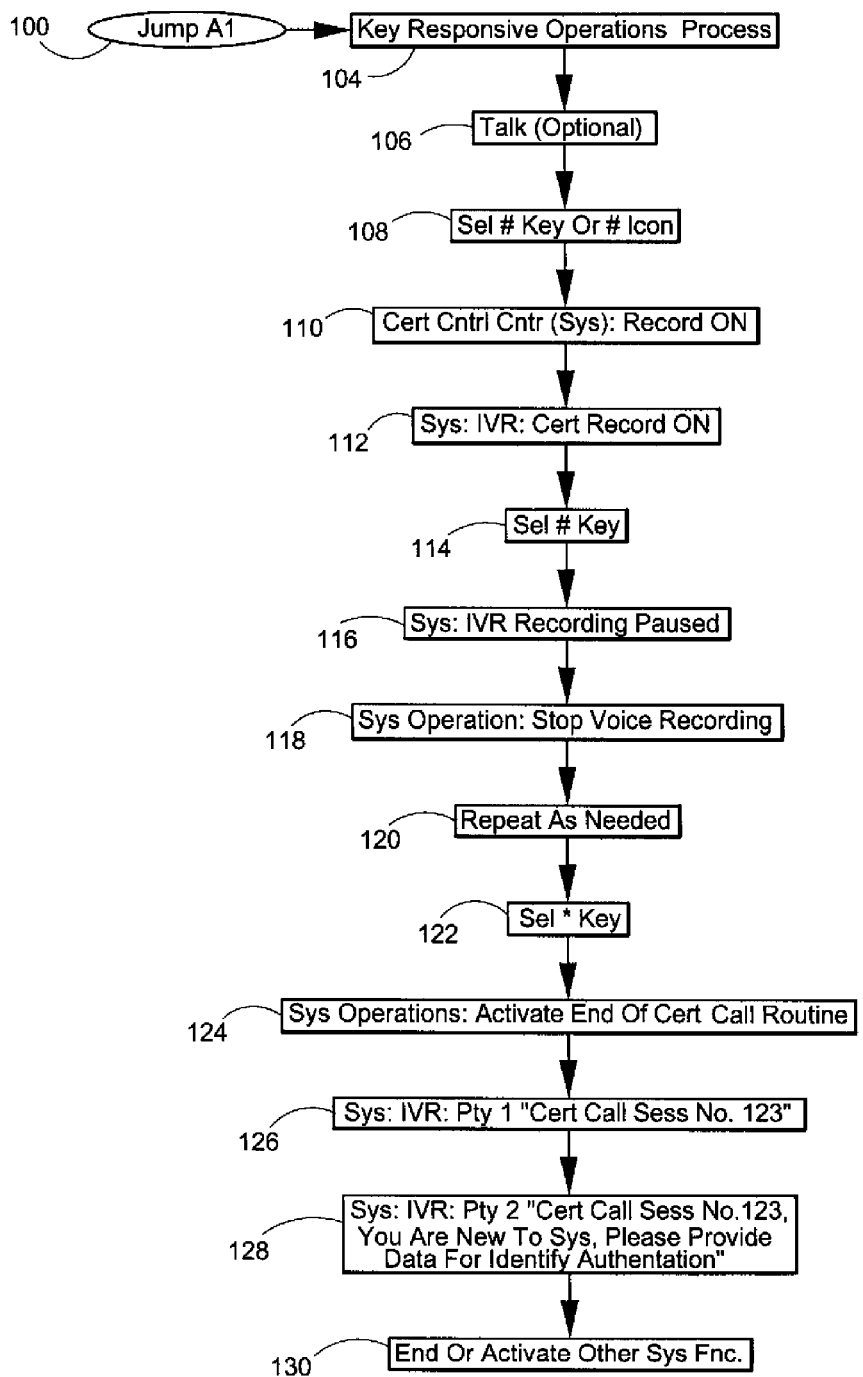

FIGS. 2A and 2B diagrammatically show the flowcharts for the present invention and these processes are generally separated into a general operation flow process shown in FIG. 2A and key responsive operation flow process in FIG. 2B. The steps in these flowcharts may be reorganized, condensed and for better processing of data. The flow charts are generally descriptive of the processes of the present invention. The figures are joined together at jump points A-1.

With respect to the general operation process in FIG. 2A, there may be several different ways to implement the present key responsive record, navigate and mark control for the present invention. FIG. 2A outlines only two scenarios but additional scenarios for the general operation process can be found in the patent entitled "Certified Communications System and Method." Those other processes are incorporated herein by reference hereto.

Process flow 70 begins by activating general operation process 72. Step 74 results in a calling party 1 (Pty 1) to initiate a call over the telecom system 14 by cell phone 16 or one of the other enabled devices. The general operation has at least two and possibly more activities signified by alternate branch 75. In step or function 76, party 1 making the call connects with the communications recording station which is either the central office A or central office B in FIG. 1. Calling party 1 activates the telecomm session at the certified call control center. At the central office, the IVR responds and information from data store 54, 55 is provided to the user at the telecom enabled device 10 requesting that the user input his or her username and password. The central office effects the delivery of audible instructions at the cell phone. The IVR unit 52 responds to audio commands from the cell phone. The communications recording stations 40, 42, 44 includes units and modules which accept and process signals from telecom devices 10 representing the user's name and the user password. Function module 80 issues instructions and requests to the user, as effected by the IVR in the communications recording station, that the user input into the comm system the called party's phone number. The called party is sometimes referred to herein as Pty 2 or party 2. Step 82 notes that the communications recording station or the certified communications system connect party 1 and party 2 via the telecomm network. Functional module 84 indicates that the communications recording station 40, 42, 44 activate the IVR and notify the called party 2 that he or she is engaged in a certified call which may be recorded. It is important to inform called Pty 2 that the telephone call may be recorded. Called party 2 indicates an acknowledgment ACK. As described in the Certified Communications System patent document, this acknowledgment ACK may be a audible sound or voice print from Pty 2 which is translated by the communications recording station 40, 42, 44 as an informational acceptance of the to-be-recorded call or, alternatively, the comm system may seek a key stroke activation by called party 2. The comm system may accept either a keystroke confirm ACK or a voice print ACK. In any event, the recording station acknowledges and records that called party 2 has accepted the certified call in step 84. In step 86, the communications station joins calling party 1 with the calling party 2.

Alternatively, from branch 75, the calling party 1 in functional module 91 connects with the called party 2 in an act independent from the comm station. The telecomm session has begun without interaction with the comm station. This alternate process branch at module 91 is independent of the communications recording stations 40, 42 and 44. In step 93 and 95, party 1 and party 2 engage in an independent conversation over telecom system 14 between the two enabled devices. In step or module 97, one of the parties places and engages, by a sequence of key strokes, processes and actions at the communications recording stations which is, in the present embodiment, the certified call control center. Therefore, functional module 97 may be activated by one party placing the on-going or in-progress telecom session "on hold" or engaging a "conference call" function on his or her enabled device 10. The enabled device and user then calls via telecom system 14 the communications recording station 40, 42, 44. In step 99, the communications station activates a log-in process for that party then connected to the station. This begins the telecomm session at the certified call control center. Step 101 recognizes that the certified call control center then joins all the parties, Pty 1 and Pty 2, together in a single telecomm communications session.

As discussed in detail in the Certified Communications System patent document referenced therein, a singular person may activate the certified call control center, in a solo operation, to record in real time audible sounds at the enabled device at his or her site. Alternatively, there may be multiple parties engaged in conversation (a multiple party conference call) wherein all the parties are on enabled devices 10 and one of these parties then activates the certified control center system as discussed also in the Certified Communications System patent document. These configurations and others discussed in the document are incorporated herein by reference.

FIG. 2B diagrammatically illustrates several of the many important aspects of the present invention. In step 104 the system activates the key responsive operation process. Step 106 recognizes that the user at enabled device 16 is talking during the telecomm session. In step 108, the user selects the # key or the # sign icon on the enabled device. That # key is an icon or a mechanical key 34 for cell phone 16. Step 110 at the certified call control center or system turns ON the recording function and, from that point forward, the signals representing the audio sounds at the enabled devices 10 are recorded in either store 54, 55 or 64. Of course, the recording may occur on several stores. Pty 1 and Pty 2 are preferably audibly notified and visually notified by a display on the phone. However, for security and integrity reasons, the Certified Communications System patent document indicates that a single store for all recorded information is a best practice. In module 112, the system activates the interactive voice response or IVR and informs users on enabled devices 10 that the record function is ON. This is important for various reasons as explained in detail in the Certified Communications System patent document. More importantly, to comply with E-sign or electronic signature statutes and regulations, notice should be given to all participants in the recording session that their communications are being presently recorded and the recording function is ON. In step 114, the user again selects the # key on the enabled device 10. In step 116, the system responds with an IVR indicator stating to all participants on the telecommunications session that the "recording is paused" or otherwise suspended (RECORD OFF). Particular responses are generated by the communications recording station. Therefore, the communications station receives a # control signal resulting from the activation of the # control key on the activated telecommunications enabled device. As a result, the communications station 40, 42, 44 activates a recording function for that recording session. Upon the next or sequential depression of the # key, the communication system responds to that # control key activation and deactivates, suspends or pauses the recording function at the communications recording session. At each record ON and at each record OFF or pause, the system activates the IVR voice and announces to the parties on the telecom session that the recording is ON or OFF. Step 118 recognizes this IVR voice announcement effecting enabled devices 10. Step 120 notes that the users can turn ON and OFF the recording session as needed.

As discussed in great detail in the Certified Communications System patent document, the control for this record ON and OFF is typically provided to a moderator that is in control of the general telecommunications session. The moderator is logged in and initiates the session with the certified call communications recorded station. However, different configurations for RECORD control can be provided to several parties engaged in the telecommunications session.

In step or module 122, the user participating in the telecom session selects and activates the * control key. In step 124, at the system operations side on the communications recording station, the system activates an end of session or end of certified call routine. This end of telecommunications event routine can take many forms as discussed in the Certified Communications System patent document. For example, one of the first steps is to terminate or end or turn OFF the recording session. In step 126, the communications recording session notifies all participants or at least some of the participants in the communications session that the certified call has ended. More importantly, in function module 126, the communications recorded station notifies at least the party that initiated the certified call event that the certified call has been assigned a session number or recording identification number. The better practice is to notify all participants. In step 128, the system, via the IVR and data storage modules, notifies the second party 2 of the certified call recording session number and makes an inquiry and notes that the second party is new to the certified system. Further, the communications recording station requests that this new, unregistered user provide data for further identity authentication (AU-ID) in the system. The Certified Communications System patent document has further details as to what information is required and how this information is gathered by the communications recording station. Step 130 ends the process or activates other end of session system functions as described in the Certified Communications System patent document.

Therefore, the present invention as been described in reasonable detail regarding the * activation and the # activation. The # activation toggles ON and OFF the record function turning ON the recording function and then sequentially turning OFF the recording function. The * key activation symbol and control end of telecommunications session (EOS) and triggers other end of session event routines. Each of these activations causes the communications recording station to notify the users of the record ON and record OFF event and the EOS termination. As for the termination, it is one of the many important features of the present invention that the users participating in the telecom session be notified of the recording session number. This notification should be provided, as a best practice, audibly and in electronic format to the participants. The Certified Communications System patent document describes a text message transmission and an email transmission to all participants showing the record session number.

Further, the key elements on enabled device 10 may be programmed such that different key elements 1, 2, 3, 4, 5, 6, 7, 8, 9 and 0 (symbols on the keypad) may be programmed to activate various functions and events at the comm station. These events may have user-assigned or system default assigned and include functions such as: a playback recorded data control signal, a rewind recorded data control, a fast forward recorded data control, an add index marker to recording control, an add bookmark to recorded data control. The index marker is typically recorded as a supplemental event in real time during the recorded control. The participants may "index" key items in real time by depression of the index key and the index markers will be recorded with the voice recording at the central station. The key functions on the enabled devices can be assigned to an operation such as to add a text message (a foot note) on recorded data as well as to add a party's identity data to the recorded session data. Further, the keys can be programmed to enable the user to add an additional voice message to the recorded data and to activate supplemental services which are listed later in the supplemental service table below. The 8 symbol key may be set to activate a user preference menu which then enables the user to turn ON and OFF sub-menu functions. These functions include: play a pre-recorded caller name upon initiation of a telecom session, play the caller name when a second party joins the telecom session, assign audible tones for different control key functions, enable voice, tone and music on hold presentations during wait times. The numeric symbol 9 key can be programmed to enable the user to return to the main menu or return to the last presented menu. Many of these function keys, when activated by the user on enabled device 10, prompt IVR voice responses from the communication station. Further, the operation of the * symbol and the # sign control symbol can be switched such that the * turns ON and OFF the record function and the # terminates the telecom session initiating an EOS end of communications session process.

General Description of System Components

It is important to know that the embodiments illustrated herein and described herein are only examples of the many advantageous uses of the innovative teachings set forth herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality. In the drawings, like numerals refer to like parts or features throughout the several views.

The present invention could be produced in hardware or software, or in a combination of hardware and software, and these implementations would be known to one of ordinary skill in the art. The system, or method, according to the inventive principles as disclosed in connection with the preferred embodiments, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in the art.

According to the inventive principles as disclosed in connection with the preferred embodiments, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer as would be known to one of ordinary skill in the art. The computer medium which may be used to hold or contain the computer program product, may be a fixture of the computer such as an embedded memory or may be on a transportable medium such as a disk or CD, as would be known to one of ordinary skill in the art. Further, the program, or components or modules thereof, may be downloaded from the Internet of otherwise through a computer network.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, flash memory, floppy disk, disk drive memory, CD-ROM, and other permanent storage. Additionally, a computer readable medium may include, for example, volatile storage such as RAM, buffers, cache memory, and network circuits. A data store is any type of computer medium capable of storing digital data therein, that is, hard drives, flash drives, RAM, ROM, etc.

Furthermore, the computer readable medium may include computer readable information in a transitory state medium such as a network link and/or a network interface, including a wired network or a wireless network, that allow a computer to read such computer readable information.

In the drawings, and sometimes in the specification, reference is made to certain abbreviations. The following Abbreviations Table provides a correspondence between the abbreviations and the item or feature.

| Abbreviations Table | |
| --- | --- |
| ACK | acknowledge, for example a user acknowledges that a telecom session may be recorded |
| admin | Administrator |

Abbreviations Table

| | |
|---|---|
| alt | alternative process |
| ALI | Automatic Location Identification. |
| ANI | Automatic Number Identification |
| arch | archive, such as secure back-up archive data storage |
| ASP | application service provider - server on a network |
| AU | authenticate |
| AV | audio-visual content includes all shared data, voice, audio, docs, images, video |
| cert | certification or certifiable |
| CD-RW | compact disk drive with read/write feature for CD disk |
| ch | channel |
| ck | check or confirm |
| CID | caller ID |
| CLID | caller line ID |
| comm | communication event or telecommunications system (where noted) |
| comm ch | communications channel, ans, caller Id, IP address |
| comm cnt | communications content, from 1 Pty, 2 Pty, group, may be audio, AV, any digital content exchanged or transferred to or through sys |
| comm device | cell phones, PDAs, computers, telecom enabled devices |
| comm sess | a communications session causing a log, a record and content save |
| comm Pty | any Party to a comm session, a caller or a called party, etc. |
| cnt | content, such as audio content recorded |
| Cntr | Center, such as a Control Center (Cntlr Cntr) |
| cntrl | control |
| DB or db | data base |
| defn | defined, such as user defined parameter |
| disp | display, sometimes displ |
| distrib | distribution |
| doc | document |
| DS | data storage |
| EMO | emotional analysis or rpt on telecom ses |
| encry | encryption |
| E-Sign | electronic signature compliant |
| ex | example |
| extr | extrinsic or data outside the Cert Sys |
| fnc | function, e.g., record function |
| geo | geographic location or code |
| GPS | global positional system, typically GPS data |
| ID | identity |
| I/O | input/output |
| intr | Intrinsic or within the cert sys |
| IVR | interactive voice response (human to and from computer) |
| kypd | keypad |
| log | a log of a rcd session, chronologic date-time stamp |
| mbr | member registered in system |
| mem | memory |
| mess | message as in SMS or text message |
| mic | microphone |
| mgt | management |
| n/a | not applicable |
| no. | number, as in phone number |
| ntwk | network |
| obj | object, for example, a data object |
| ofc. | office |
| opt | optional |
| ph | phone as in phone number |
| pgm | program |
| profile | all data about a member in system |
| Pty | party, such as caller party or called party |
| p/w | password |
| record | as in "Record the voice," a Record fnc. |
| reg | registered as in Reg User or Reg Member (mbr), sometimes reg'd |
| rel | release |
| reqmt | requirement or protocol, may be optional |
| rqst | request |
| rev | review |
| rpt | report |
| rt | real time or within a reasonable, somewhat predictable time after the event |
| sch | search |
| scrn | screen, as in touch screen computer enabled device |
| sec | security |
| seg | segment |
| sel | select |
| serv | service, as in transcription service |
| sess | telecom secession, audio, AV, Internet |
| S profile | summary or short form user profile |
| SL | security level (sometimes S1 for security level 1, etc.) |
| SMI | system management interface |
| spkr | speaker |
| srvr | server |
| std | standard |
| sys | system |
| t | time, usually time period |
| telecom | telecommunications system or network |
| temp | temporary |
| transcr | transcription audio to text |
| transl | translation to other language |
| trkr | tracker as in access tracker or geo tracker |
| TTPS | trusted third party server system |
| u/n | user name, see u/n and p/w, user name and password |
| unkn | unknown |
| URL | Uniform Resource Locator, x pointer, or other network locator, may be a mini-url for cell phone or PDA use |
| VOIP | voice over Internet Protocol |

The claims appended hereto are meant to cover modifications and changes within the scope and spirit of the present invention.

What is claimed is:

1. A key responsive record, navigation and marking method for controlling a communications system, the communications system includes a plurality of telecommunications enabled devices, each with a plurality of actuatable control key elements thereon which include a key bearing a * symbol and a key bearing a # symbol and each with a speaker and a microphone for a telecommunications session, said plurality of telecommunications enabled devices communitively coupled via a telecommunications network to a communications recording station, said communications station having a data recording module and an interactive voice response module for effecting a delivery of audible instructions to a user operating an activated telecommunications enabled device during a two-way communications session between said user and at least one other user who is another user in said session, the key responsive record, navigation and marking control method comprising:

during a communications sessions between said user and said another user through respective telecommunications enabled devices using the telecommunications network and coupled through said communications recording station:

receiving a * control signal at said communications recording station resulting from activation of said * control key on said activated telecommunications enabled device by said user sent over said telecommunications network to said communications recording station; and, upon receipt of the * control signal, activating an end of telecommunications event routine which includes the cessation of a recording session by said data recording module at said communications recording station.

2. A key responsive record, navigation and marking method for controlling a communications system as claimed in claim 1 wherein the end of telecommunications event routine includes effecting an announcement over said telecommunications network to both said user and said another user on said activated device via said voice response module at said communications station indicating to both said user and said another user a unique recording session identifier for said recording session.

3. A key responsive record, navigation and marking method for controlling a communications system as claimed in claim 2 wherein the receipt of said * control signal occurs during an active telecommunications session between said activated device and said communications station and said * control signal announced to both said user and said another user.

4. A key responsive record, navigation and marking method for controlling a communications system as claimed in claim 3 wherein the end of telecommunications event routine includes effecting the announcement on said activated device via said voice response module indicating control options for one or more of: a save data control, an add voice data to recorded data control, add identity data to recorded data control, a terminate said active telecommunications session control and a resume said active telecommunications session.

5. A key responsive record, navigation and marking method for controlling a communications system as claimed in claim 4 wherein each telecommunications enabled device has actuatable key elements bearing a different symbol from the group of symbols including numeric symbols 1, 2, 3, 4, 5, 6, 7, 8, 9 and 0 in addition to said * symbol and said # symbol, the key responsive record, navigation and marking control method further including:
receiving, at said communications station, user defined controls for one or more of said keys bearing numeric symbols 1, 2, 3, 4, 5, 6, and 7 on said activated device, respective ones of the keys bearing numeric symbols 1, 2, 3, 4, 5, 6, and 7 having user assigned functions including: a playback recorded data control, a rewind recorded data control, a fast forward recorded data control, an add index marker to recorded data in real time during recording control, a link text message to recorded data control, an add party identity data control, and an add user voice message to recorded data control; and a supplemental service activation control.

6. A key responsive record, navigation and marking method for controlling a communications system as claimed in claim 3 wherein each telecommunications enabled device has an actuatable key elements bearing a numeric symbol 8 in addition to said * symbol key and said # symbol key, the key responsive record, navigation and marking control method further including:
receiving, at said communications station, a symbol 8 control signal resulting from activation of said symbol 8 control key by said activated telecommunications enabled device; and
effecting the announcement on said activated device via said voice response module indicating a preferences menu including enabling and disabling one or more functions from the group of functions including: effecting the announcement of a pre-recorded caller name played upon initiation of said active telecommunications session function, activating a second telecommunications session with another telecommunications enabled device function, assigning audible tones for said actuatable control key elements function, and enabling voice, tone and music on hold presentation function.

7. A key responsive record, navigation and marking method for controlling a communications system as claimed in claim 3 wherein each telecommunications enabled device has an actuatable key elements bearing a numeric symbol 9 in addition to said * symbol key and said # symbol key, the key responsive record, navigation and marking control method further including:
receiving, at said communications station, a symbol 9 control signal resulting from activation of said symbol 9 control key on said activated telecommunications enabled device; and
activating a return to main menu routine or return to last presented menu routine and effecting an announcement via said voice response module indicating the return to menu.

8. A key responsive record, navigation and marking method for controlling a communications system as claimed in claim 1 including:
receiving, at said communications station, a # control signal resulting from activation of said # control key on said activated telecommunications enabled device from said user over said telecommunications network; and
sequentially activating and deactivating a recording function for said recording session by said data recording module at said communication station based upon sequential activation of said # control key over said telecommunications network.

9. A key responsive record, navigation and marking method for controlling a communications system as claimed in claim 8 wherein for each sequential activation of said # control key, effecting an announcement, via said voice response module, said announcement made on said activated device to both said user and said another user indicating a status of said recording function, said announcement sent via said telecommunications network.

10. The key responsive record, navigation and marking method as claimed in claim 1 wherein the communications recording station is a distributed recording station with said data recording module remote from said interactive voice response module, the method including coordinating said data recording module remote with said interactive voice response module for effecting the recording of said telecommunications session at said communications station.

11. A key responsive record, navigation and marking method for controlling a communications system which includes a plurality of telecommunications enabled devices, each with a plurality of actuatable control key elements thereon which include a key bearing a * symbol and a key bearing a # symbol and each with a speaker and a microphone for a telecommunications session, said plurality of telecommunications enabled devices communitively coupled via a telecommunications network to a communications recording station, said communications station having a data recording module and an interactive voice response module for effecting a delivery of audible instructions to a user operating an activated telecommunications enabled device during a two-way communications sessions session between said user and at least one other another user who is another user in said session, the key responsive record, navigation and marking control method comprising:
during a communications sessions between said user and said another user through respective telecommunications enabled devices using the telecommunications network and coupled through said communications recording station:
receiving, at said communications recording station, a # control signal resulting from activation of said # control key on said activated telecommunications enabled device from said user, said # control signal sent over said telecommunications network to said communications recording station; and
sequentially activating and deactivating a recording function for said recording session by said data recording module at said communications recording station based upon sequential activation of said # control key during the communications session.

12. A key responsive record, navigation and marking method for controlling a communications system as claimed in claim 11 wherein for each sequential activation of said # control key, effecting an announcement, via said voice response module, said announcement made on said activated device indicating a status of said recording function.

13. A key responsive record, navigation and marking method for controlling a communications system which includes a plurality of telecommunications enabled devices, each with a plurality of actuatable control key elements thereon which include a key bearing a * symbol and a key bearing a # symbol and each with a speaker and a microphone for a telecommunications session, said plurality of telecommunications enabled devices communitively coupled via a telecommunications network to a communications recording station, said communications station having a data recording module and an interactive voice response module for effecting a delivery of audible instructions to a user operating an activated telecommunications enabled device during a two-way communications session between said user and at least one other user who is another user, the key responsive record, navigation and marking control method comprising:
during a communications sessions between said user and said another user through respective telecommunications enabled devices using the telecommunications network and coupled through said communications recording station:
receiving, at said communications recording station, one of a * control signal and a # control signal resulting from activation of the corresponding # control key and * control key on said activated telecommunications enabled device sent over said telecommunications network to said communications recording station; and
either activating and deactivating a recording function for said recording session by said data recording module at said communications recording station based upon activation of said # control key or said * control key; or
activating an end of telecommunications event routine which includes the cessation of a recording session by said data recording module at said communications recording station based upon the activated control key.

14. A key responsive record, navigation and marking method for controlling a communications system as claimed in claim 13 wherein
effecting an announcement on said activated device to both said user and said another user indicating a status of said recording function via said voice response module at said communications station sent over said telecommunications network; and
effecting the announcement on said activated device to both said user and said another user via said voice response module indicating a unique recording session identifier for said recording session at said communications station sent over said telecommunications network.

15. A key responsive record, navigation and marking method for controlling a communications system as claimed in claim 14 wherein the receipt of said * control signal occurs during an active telecommunications session between said activated device and said user and said communications station and said another user.

16. A key responsive record, navigation and marking method for controlling a communications system as claimed in claim 15 wherein the end of telecommunications event routine includes effecting the announcement on said activated device via said voice response module indicating control options for one or more of a save data control, an add voice data to recorded data control, add identity data to recorded data control, a terminate said active telecommunications session control and a resume said active telecommunications session.

17. A key responsive record, navigation and marking method for controlling a communications system as claimed in claim 16 wherein each telecommunications enabled device has actuatable key elements bearing a different symbol from the group of symbols including numeric symbols 1, 2, 3, 4, 5, 6, 7, 8, 9 and 0 in addition to said * symbol and said # symbol, the key responsive record, navigation and marking control method further including:
receiving, at said communications station from said user with said activated device, user defined controls for one or more of said keys bearing numeric symbols 1, 2, 3, 4, 5, 6, and 7 on said activated device, respective ones of the keys bearing numeric symbols 1, 2, 3, 4, 5, 6, and 7 having user assigned functions including a playback recorded data control, a rewind recorded data control, a fast forward recorded data control, an add index marker to recorded data in real time during recording control, a link text message to recorded data control, an add party identity data control, an add user voice message to recorded data control; and a supplemental service actuation control.

18. A key responsive record, navigation and marking method for controlling a communications system as claimed in claim 17 wherein each telecommunications enabled device has an actuatable key elements bearing a numeric symbol 8 in addition to said * symbol key and said # symbol key, the key responsive record, navigation and marking control method further including:
receiving, at said communications station via said telecommunications network from said user, a symbol 8 control signal resulting from activation of said symbol 8 control key by said activated telecommunications enabled device; and
effecting the announcement on said activated device via said voice response module from said communications station to said user indicating a preferences menu including enabling and disabling functions from the group including: effecting an announcement of a pre-recorded caller name played upon initiation of said active telecommunications session, activating a second telecommunications session with another telecommunications enabled device, assigning audible tones for said actuatable control key elements, and enabling voice, tone and music on hold presentations.

19. A key responsive record, navigation and marking method for controlling a communications system as claimed in claim 18 wherein each telecommunications enabled device has an actuatable key elements bearing a numeric symbol 9 in addition to said * symbol key and said # symbol key, the key responsive record, navigation and marking control method further including:
receiving, at said communications station from either said user's activated device of said another user's activated device over the telecommunications network, a symbol 9 control signal resulting from activation of said symbol 9 control key on said activated telecommunications enabled device; and
activating a return to main menu routine or return to previous menu.

20. A non-transitory computer readable medium containing programming instructions for controlling a communications system with a key responsive record, navigation and marking method which includes a plurality of telecommunications enabled devices, each with a plurality of actuatable control key elements thereon which include a key bearing a * symbol and a key bearing a # symbol and each with a speaker and a microphone for a telecommunications session, said plurality of telecommunications enabled devices communitively coupled via a telecommunications network to a communications recording station, said communications station having a data recording module and an interactive voice response module for effecting a delivery of audible instructions to a user operating an activated telecommunications enabled device during a two-way communications session session between said user and at least one other user who is another user in said session, the key responsive record, navigation and marking control method comprising:

during a communications sessions between said user and said another user via through respective telecommunications enabled devices using the telecommunications network and coupled through said communications recording station:

receiving, at said communications recording station, one of a * control signal and a # control signal resulting from activation of the corresponding # control key and * control key by said user on said activated telecommunications enabled device; and either activating and deactivating a recording function for said recording session by said data recording module based upon activation of said # control key or said * control key; or activating an end of telecommunications event routine which includes the cessation of a recording session by said data recording module based upon the activated control key.

21. A non-transitory computer readable medium containing programming instructions as claimed in claim 20 for controlling a communications system as claimed in claim 20 wherein effecting an announcement on said activated device indicating a status of said recording function via said voice response module; and effecting the announcement on said activated device via said voice response module indicating a unique recording session identifier for said recording session.

22. A non-transitory computer readable medium containing programming instructions as claimed in claim 21 for controlling a communications system as claimed in claim 14 wherein the receipt of said * control signal occurs during an active telecommunications session between said activated device and said communications station.

23. A computer readable medium containing programming instructions as claimed in claim 20 for controlling a communications system as claimed in claim 22 wherein the end of telecommunications event routine includes effecting the announcement on said activated device via said voice response module indicating control options for one or more of a save data control, an add voice data to recorded data control, add identity data to recorded data control, a terminate said active telecommunications session control and a resume said active telecommunications session.

* * * * *